United States Patent
Rose et al.

(10) Patent No.: US 11,383,572 B1
(45) Date of Patent: Jul. 12, 2022

(54) PULLEY ASSEMBLY FOR RAISING AND LOWERING THE HEIGHT OF A VEHICLE

(71) Applicant: BeijingWest Industries Co., Ltd, Beijing (CN)

(72) Inventors: Iain Rose, Luton Beds (GB); Baptiste Chevallereau, Paris (FR); Jocelyn Marchand, Levallois Perret (FR); Philippe Herda, Tremblay (FR)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 17/235,861

(22) Filed: Apr. 20, 2021

(51) Int. Cl.
*B60G 17/015* (2006.01)
*B60G 11/14* (2006.01)

(52) U.S. Cl.
CPC ............ *B60G 17/015* (2013.01); *B60G 11/14* (2013.01); *B60G 2202/12* (2013.01); *B60G 2500/30* (2013.01)

(58) Field of Classification Search
CPC .. B60G 17/015; B60G 11/14; B60G 2202/12; B60G 2500/30
See application file for complete search history.

(56) References Cited

U.S. PATENT DOCUMENTS

| | | | | |
|---|---|---|---|---|
| 1,068,182 A | * | 7/1913 | Steiner | B60G 11/14 267/272 |
| 1,593,759 A | * | 7/1926 | Dixon | B60G 11/14 267/194 |
| 2,706,059 A | * | 4/1955 | Parker | B62D 53/065 280/441.2 |
| 2,707,062 A | * | 4/1955 | Parker | B62D 53/065 280/441.2 |
| 2,864,626 A | | 12/1958 | Schantz | |
| 3,858,902 A | * | 1/1975 | Howells | B60G 15/00 267/221 |
| 5,137,413 A | | 8/1992 | Ressler | |
| 5,306,038 A | | 4/1994 | Henderson, Jr. | |
| 5,700,026 A | | 12/1997 | Zalewski et al. | |
| 7,237,779 B2 | | 7/2007 | Kondo et al. | |

(Continued)

FOREIGN PATENT DOCUMENTS

| | | |
|---|---|---|
| DE | 3934499 C2 | 1/1998 |
| FR | 2491014 A1 | 4/1982 |

(Continued)

*Primary Examiner* — Paul N Dickson
*Assistant Examiner* — Kurtis Nielson
(74) *Attorney, Agent, or Firm* — William H. Honaker; Dickinson Wright PLLC

(57) ABSTRACT

A pulley assembly for raising and lowering an associated vehicle body comprising a housing including an outer sleeve extending along an axis. At least one top pulley wheel is operably connected to the outer sleeve and at least one bottom pulley wheel is operably connected to the outer sleeve and moveable relative to the at least one top pulley wheel along the axis. A cable is weaved between the at least one top pulley wheel and the at least one bottom pulley wheel. An actuator is operably connected to the cable to reel-in the cable and draw the at least one top pulley wheel towards the at least one bottom pulley wheel to lower the associated vehicle body. The actuator further reels-out the cable to permit the at least one top pulley wheel to move away from the at least one bottom pulley wheel to raise the associated vehicle body.

20 Claims, 2 Drawing Sheets

(56) References Cited

U.S. PATENT DOCUMENTS

| | | |
|---|---|---|
| 8,029,001 B2 | 10/2011 | Kim |
| 9,415,652 B2 | 8/2016 | McGuire |
| 2003/0197336 A1 | 10/2003 | Kim |
| 2004/0217561 A1* | 11/2004 | Kondo ................ B60G 21/051 280/6.157 |
| 2006/0163825 A1* | 7/2006 | Hamm ............... B60G 17/0152 280/5.502 |
| 2015/0197130 A1 | 7/2015 | Smith et al. |

FOREIGN PATENT DOCUMENTS

| | | | |
|---|---|---|---|
| JP | 2006341748 A | 12/2006 | |
| WO | WO-9625312 A1 * | 8/1996 | ........... B60G 17/017 |

* cited by examiner

PULLEY ASSEMBLY FOR RAISING AND LOWERING THE HEIGHT OF A VEHICLE

BACKGROUND OF THE INVENTION

1. Field of the Invention

The present invention generally relates to a pulley assembly for raising and lowering the height of a vehicle.

2. Description of the Prior Art

It is oftentimes beneficial to adjust the height of a vehicle body. For example, by raising the vehicle body to an extended position or lowering the vehicle body to a constricted position, the ground and roof clearance can be modified permitting travel in conditions that would not otherwise be possible or advisable. Devices that facilitate this adjustment are traditionally provided in or around suspension struts of motor vehicles. Typically, such devices include a lift housing disposed on a center axis defining a chamber. A support tube is disposed in the chamber with the lift housing being movable along the center axis relative to the support tube. The movement of the lift housing is oftentimes driven using a hydraulic actuator. While these hydraulic actuators provide the functionality as described above, there are certain drawbacks and inefficiencies. For example, if the lift housing needs to be held in the extended position for a prolonged period, a constant hydraulic pressure is required increasing susceptibility to internal leakage. Another popular technology oftentimes used to adjust the height of the vehicle body are ballscrew mechanisms or solenoid activated mechanisms, e.g. a pneumatic suspension. However, the solenoid activated mechanisms require electric power input for the locking/unlocking of the solenoid valve which is slow in response time and requires a high energy consumption.

Accordingly, there is a continuing desire to improve upon the operational framework and efficiency of devices that adjust the height of a vehicle body.

SUMMARY OF THE INVENTION

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims. This section provides a general summary of the disclosure and is not to be interpreted as a complete and comprehensive listing of all of the objects, aspects, features and advantages associated with the present disclosure.

The invention provides for a pulley assembly that efficiently raises and lowers the height of a vehicle body thereby improving upon the operational framework and efficiency of traditional devices that have been used to adjust the height of a vehicle body. Further, the present invention provides for a pulley assembly that has a simple design and a low cost in production.

It is one aspect of the present invention to provide a pulley assembly for raising and lowering an associated vehicle body. The pulley assembly comprises a housing including an outer sleeve extending along an axis. At least one top pulley wheel is operably connected to the outer sleeve and at least one bottom pulley wheel is operably connected to the outer sleeve and moveable relative to the at least one top pulley wheel along the axis. A cable is weaved between the at least one top pulley wheel and the at least one bottom pulley wheel. An actuator is operably connected to the cable to reel-in the cable and draw the at least one top pulley wheel relative to and towards the at least one bottom pulley wheel along the axis to lower the associated vehicle body. The actuator further reels-out the cable to permit the at least one top pulley wheel to move relative to and away from the at least one bottom pulley wheel to raise the associated vehicle body.

It is another aspect of the present invention to provide a pulley assembly for raising and lowering an associated vehicle body. The pulley assembly comprises a housing including an outer sleeve extending along an axis. A dampening mechanism is located within the outer sleeve. An upper mounting ring and a lower mounting ring are operably connected to the outer sleeve, wherein the upper mounting ring is moveable relative to the lower mounting ring along the axis. A plurality of top pulley wheels are operably connected to the upper mounting ring and a plurality of bottom pulley wheel are operably connected to the lower mounting ring. A cable is weaved between the plurality of top pulley wheels and the plurality of bottom pulley wheels. A spool assembly is operably connected to the cable to reel-in the cable and draw the upper mounting ring relative to and towards the lower mounting ring along the axis to lower the associated vehicle body and to reel-out the cable to permit the upper mounting ring to move relative to and away from the lower mounting ring to raise the associated vehicle body.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Example embodiments will now be described more fully with reference to the accompanying drawings. In general, the subject embodiments are directed to a pulley assembly for raising and lowering the height of a vehicle. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the several views, a pulley assembly is provided for raising and lowering the height of the vehicle. The pulley assembly improves upon the operational framework and efficiency of traditional devices that have been used to adjust the height of a vehicle body.

Figure 1:
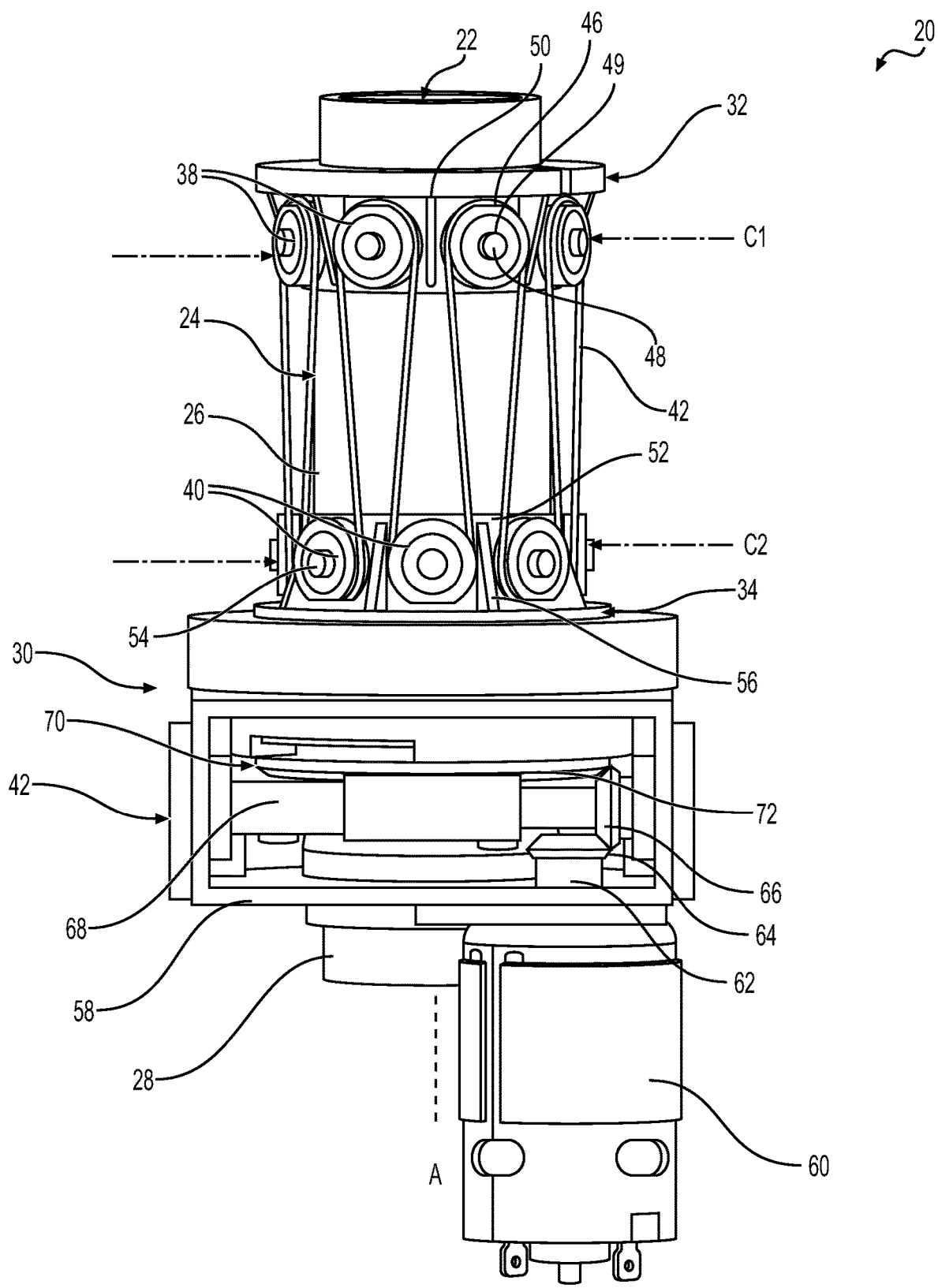
FIG. 1 is a side view of a pulley assembly for raising and lowering the height of a vehicle in accordance with principles of the present disclosure.

Referring initially to FIG. 1, the pulley assembly 20 is constructed in accordance with principles of the present invention. In some embodiments, the pulley assembly 20 may be incorporated with a dampening mechanism 22. For example, the dampening mechanism 22 may be a twin tube, magnetorheological fluid, hydraulic, pneumatic, coil spring, other configurations, or combinations thereof. The pulley assembly 20 includes a housing 24 including an outer portion (outer sleeve 26) and an inner portion (inner sleeve 28) disposed within the outer sleeve 26. The outer sleeve 26 and inner sleeve 28 extend along an axis A and the outer sleeve 26 and inner sleeve 28 may be moveable relative to one another along the axis A. The pulley assembly 20 includes an upper mounting ring 32 and a lower mounting ring 34. In some embodiments, the upper mounting ring 32 is axially connected to the outer sleeve 26 for conjoint axial movement therewith and the lower mounting ring 34 is slidably connected to the outer sleeve 26 to permit the outer sleeve 26 and upper mounting ring 32 to move axially relative to the lower mounting ring 34. In some embodiments, the inner sleeve 28 is a dampening tube or is otherwise operably connected (e.g., via the upper mounting ring 32) to a dampening tube of the dampening mechanism 22 such that relative movement between the upper mounting ring 32 and the lower mounting ring 34 results in expansion or contraction of the dampening mechanism 22 along the axis A thereby raising and lowering the vehicle body (not shown). Thus, in some embodiments, the upper mounting ring 32 is connected to the inner sleeve 28 and the lower mounting ring is connected to outer sleeve 26 such that relative movement therebetween results in equal movement between the outer sleeve 26 and the inner sleeve 28 raising and lowering the vehicle body.

With continued reference to FIG. 1, the pulley actuator 30 further includes at least one top pulley wheel 38 operably and rotatably connected to the outer sleeve 26, the inner sleeve 28, the upper mounting ring 32, or a combination thereof. At least one bottom pulley wheel 40 operably and rotatably connects to the outer sleeve 26, the inner sleeve 28, the lower mounting ring 34, a stationary component of the vehicle, or a combination thereof. A cable 42 is weaved through the at least one top pulley wheel 38 and the at least one bottom pulley wheel 40 such that tension on the cable 42 causes the upper mounting ring 32 and the lower mounting ring 34 to move relative to and towards one another along the axis A, thereby contracting the dampening assembly 22. In some embodiments, the cable 42 is formed of steel, for example, a strand steel of 1.2 to 2 mm gauge. As will be described in greater detail below, a powered actuator 44 is operably connected to the cable 42 for tensioning and releasing the cable 42.

The at least one top pulley wheel 38 may include a plurality of top pulley wheels 38 and the at least one bottom pulley wheel 40 may include a plurality of bottom pulley wheels 40. In some embodiments, the plurality of top pulley wheels 38 includes three or more, four or more, five or more, six or more, seven or more, or eight or more. In some embodiments, the plurality of bottom pulley wheels 40 includes three or more, four or more, five or more, six or more, seven or more, or eight or more. In some embodiments, the number of top pulley wheels 38 and bottom pulley wheels are equal. The plurality of top pulley wheels 38 are disposed circumferentially about the axis A along a first circumference C1 and the plurality of bottom pulley wheels 40 are disposed circumferentially about the axis A along a second circumference C2. In some embodiments, the first circumference C1 is equal in size to the second circumference C2. In some embodiments, the plurality of top pulley wheels 38 are disposed equidistantly about the first circumference C1 and the plurality of bottom pulley wheels 40 are disposed equidistantly about the second circumference C2. In some embodiments, the plurality of top pulley wheels 38 are circumferentially misaligned with the plurality of bottom pulley wheels 40, for example, each of the top pulley wheels 38 may be circumferentially aligned with a central location between adjacent bottom pulley wheels 40. Each pulley 38, 40 may include a groove 44 having a u-shaped cross-section for retaining the cable 42. When assembled, the cable 42 may be threaded clockwise or counter clockwise around the axis A such that it operably connects from one of the top pulley wheels 38 and extends down and operably connects to a circumferentially adjacent bottom pulley wheel 40 wherein it extends up to operably connect to a circumferentially adjacent top pulley wheel 38 wherein the threaded pattern continues.

Each of the top pulley wheels 38 may be connected to a top pulley ring 46 with an upper bearing pin 48. In some embodiments, each top pulley wheel 38 rotationally connects to the upper bearing pin 48 with a circlip 49. The top pulley ring 46 is located directly under the upper mounting ring 32 and may be integral therewith or a separate component. A top fin 50 is located centrally between each adjacent top pulley wheel 38 to provide structural support and may also assist in maintaining the cable 42 in position such that it cannot be removed without deweaving. Each of the bottom pulley wheels 40 may be connected to a bottom pulley ring 52 with a lower bearing pin 54. In some embodiments, each bottom pulley wheel 40 rotationally connects to the lower bearing pin 54 with a circlip 49. The bottom pulley ring 52 is located directly over the lower mounting ring 30 and may be integral therewith or a separate component. A bottom fin 56 is located centrally between each adjacent bottom pulley wheel 40 to provide structural support and may also assist in maintaining the cable 42 in position such that it cannot be removed without deweaving. Thus, in some embodiments, each top pulley wheel 38 may be circumferentially aligned with a bottom fin 56 and each bottom pulley wheel 40 may be circumferentially aligned with a top fin 50. Each of the top fins 50 and each of the bottom fins 56 may taper towards the axis A as they extend axially towards each other.

Figure 2:
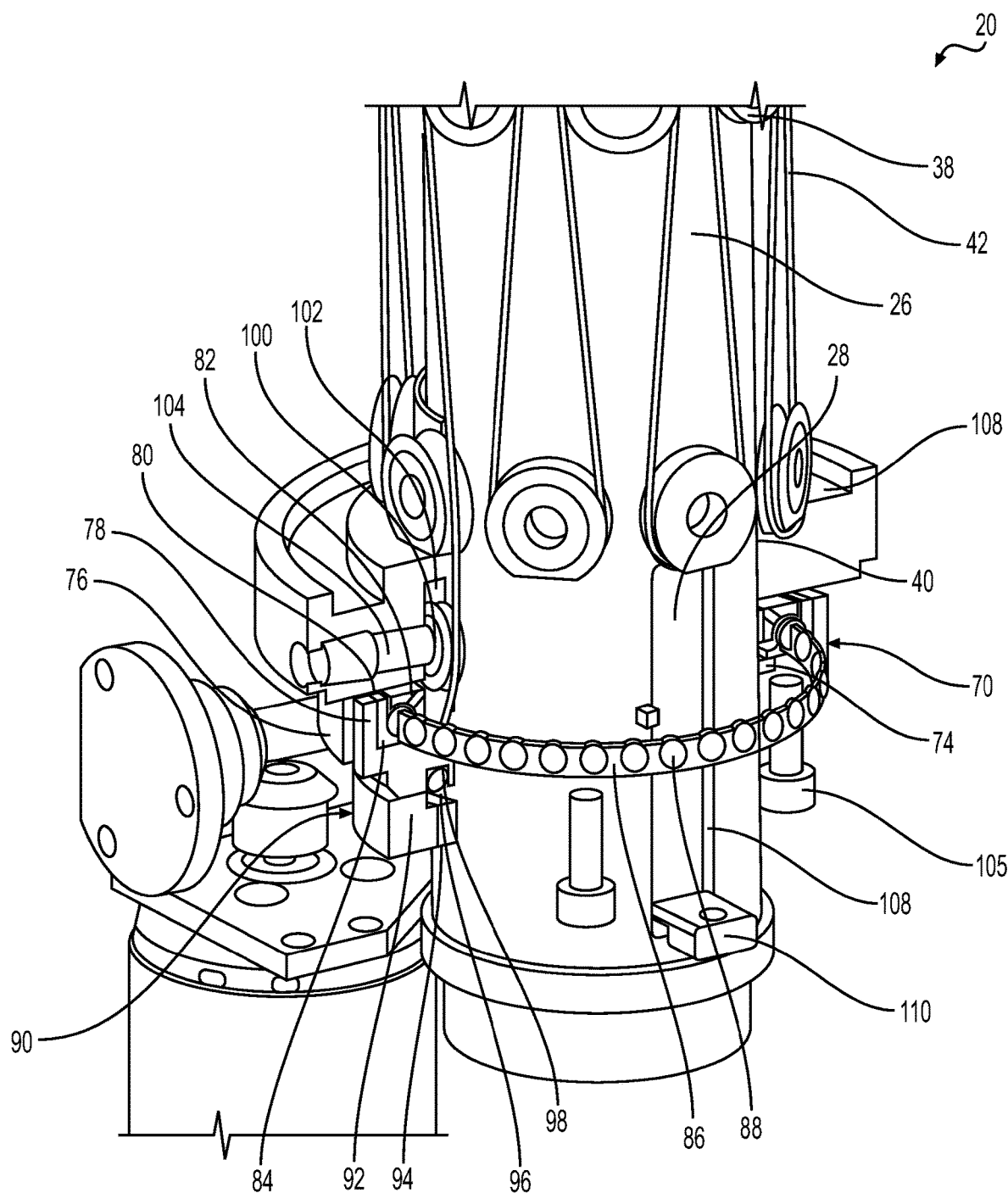
FIG. 2 is a perspective and partially sectioned view of the pulley assembly.

As best illustrated in FIG. 1 and FIG. 2, at least portions of the powered actuator 44 are located within an actuator housing 58. The actuator housing 58 may be integral with, directly coupled to, or indirectly coupled to the lower mounting ring 34. The powered actuator 44 includes a motor 60 having a motor shaft 62 extending into the actuator housing 58. The motor 60 may be an electric motor. A first bevel gear 64 couples to the motor shaft 62. A second bevel gear 66 is located in the actuator housing 58 and is in mesh engagement with the first bevel gear 64. A worm screw 68 is also disposed in the actuator housing 58 and couples to the second bevel gear 66 for conjoint rotation therewith. The worm screw 68 is supported on opposite ends by a pair of bearing supports 68 coupled to the actuator housing 58.

As best illustrated in FIG. 2, the powered actuator 44 includes a spool assembly 70 operably connected to the worm gear 66 such that rotation of the worm gear 66 causes movement of the spool assembly 70. Movement of the spool assembly 70 may either reel-in the cable 42 and move the plurality of top pulley wheels 38 towards the plurality of bottom pulley wheels 40 or reel-out the cable 42 to permit the plurality of top pulley wheels 38 to move away from the plurality of bottom pulley wheels 40. The spool assembly 70 includes a worm wheel 72 in meshed engagement with the worm screw 68, such that rotation of the worm screw 68 causes clockwise or counterclockwise rotation of the worm wheel 72. The worm wheel 72 defines a spool channel 74, an outer wall of which is connected to one end of the cable 42 and such that rotation of which causes the cable 42 to travel therewith between the reeling-in condition wherein the cable 42 spools in the spool channel 74 and the reeling-out condition wherein the cable despools from the spool channel 74. In some embodiments, the powered actuator 44 and spool assembly 70 may be configured as a traditional winch.

With continued reference to FIG. 2, the spool assembly 70 is located under the lower mounting ring 34. The lower mounting ring 34 includes a top flange 76 projecting downwardly defining an upper annular opening for locating at least a portion of the spool assembly 70. The spool assembly 70 includes a bottom flange 78 projecting upwardly towards the lower mounting ring 34 and seated within the upper annular opening at least in a reeled-in condition. When assembled, the upper annular opening and the lower annular opening define a bearing retaining opening 80 having an annular shape. A lower bearing race 82 is located within the lower annular opening portion and an upper bearing race 84 is located in the upper annular opening portion. A bearing ring 86 is located between the lower bearing race 82 and the upper bearing race 84. The bearing ring 86 defines a plurality of bearing holding apertures with a bearing 88 located in each bearing holding aperture. In some embodiments, each bearing 88 may be a ball bearing having a generally spherical shape.

In operation, the bearing ring 86 facilitates rotational movement of the spool assembly 70 with respect to the lower mounting ring 34 and outer sleeve 26. A retention ring 90 is located under the spool assembly 70 to axially locate the spool assembly 70 next to the lower mounting ring 34. The retention ring 90 may include a an outer retention ring 92 and an inner retention ring 94. A bottom surface of the spool assembly 70 may define a bearing retaining channel 96 and at least one lower bearing 98 may be located in the bearing retaining channel 96 in contact with the bottom surface of the spool assembly 70 and a top surface of the retention ring 90, for example, the inner retention ring 94.

At least one winch pulley 100 is located adjacent to the spool channel 74 for directing the cable 42 into the spool channel 74. In some embodiments, the at least one winch pulley 100 is located in a winch holding cavity 102 in the lower mounting ring 34 and is rotationally supported by a winch pulley pin 104. The lower mounting ring 34 may be at least partially supported on the outer sleeve 26 by one or more fasteners 105.

A top surface of the lower mounting ring 34 defines a spring seat groove 106 for locating a helical spring (not shown) that biases the lower mounting ring 34 away from the upper mounting ring 32. In some embodiments, the helical spring may be a suspension coil spring. The lower mounting ring 34 may further define a cable receiving aperture (see FIG. 3) adjacent to the winch holding cavity 102 that permits the cable 42 to extend therethrough to the spool assembly 70. While one end of the cable 42 is attached to the spool assembly 70 an opposite end of the cable 42 may also be attached/anchored to the spool assembly 70, the upper mounting ring 32, the lower mounting ring 34, one of the pulley wheels 38, 40, or another component. The outer sleeve 26 defines an anti-rotation channel 108 extending parallel to the axis A and the inner sleeve 28 includes an anti-rotation tab 110 projecting out of the anti-rotation channel 108. In operation, the anti-rotation tab 110 is guided within the anti-rotation channel 108 to facilitate axial movement and prevent relative rotation between the outer sleeve 26 and the inner sleeve 28. In some embodiments, the lower mounting ring 34 is connected to the anti-rotation tab 110 and the upper mounting ring 32 is connected to the outer sleeve 26 such that relative movement therebetween results in equal movement between the outer sleeve 26 and the inner sleeve 28.

In operation, as the cable 42 is reeled-in by the actuator 44, the upper mounting ring 32 and the lower mounting ring 34 are caused to move relative to and towards one another, compressing the spring, and lowering the vehicle body. As the cable 42 is reeled-out by the actuator 44, the upper mounting ring 32, and the lower mounting ring 34 are caused to move relative to and away from one another via expansion of the spring and/or dampening mechanism 22 to raise the vehicle body. In some embodiments, the spool assembly 70 may be biased towards the reel-in position, such that any absorption/compression of the dampening mechanism 22 permits non-tensioned portions of the cable 42 to be reeled-in without directly causing raising and lowering of the vehicle body. A pulley assembly 20 as described herein with 8 top and 8 bottom pulley wheels has been shown to lift a vehicle corner weight (for example 7000N for a large SUV) by applying only 7000/15=467 N tension on the cable 42, which is within the capability of a 1.2 mm to 2 mm gauge stranded steel cable. The requirements of the motor 60 is approximately 350 Joules in 3 seconds at an average of approximately 120 Watts. Thus in some embodiments, the motor 60 may be at least a 120 Watt motor. In some embodiments, the motor 60 may be larger, for example, 300 Watts to account for efficiency loss throughout service life. In some embodiments, the spool assembly 70 defines a spool channel 74 that is configured to rotate approximately four turns in three seconds for moving the cable 42 between a completely reeled-in position and a completely reeled-out position.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. The term "relative" movement between a first part and a second part may mean that only the first part moves, the second part moves, or both the first part and the second part move with respect to one another.

What is claimed is:

1. A pulley assembly for raising and lowering an associated vehicle body comprising:
    a housing including an outer sleeve extending along an axis;
    at least one top pulley wheel operably connected to the outer sleeve;
    at least one bottom pulley wheel operably connected to the outer sleeve and moveable relative to the at least one top pulley wheel along the axis;
    a cable weaved between the at least one top pulley wheel and the at least one bottom pulley wheel; and
    an actuator operably connected to the cable to reel-in the cable and draw the at least one top pulley wheel relative to and towards the at least one bottom pulley wheel along the axis to lower the associated vehicle body and to reel-out the cable to permit the at least one top pulley wheel to move relative to and away from the at least one bottom pulley wheel to raise the associated vehicle body.

2. The pulley assembly as set forth in claim 1, wherein a spring biases the at least one top pulley wheel away from the at least one bottom pulley wheel along the axis.

3. The pulley assembly as set forth in claim 1, wherein the at least one top pulley wheel includes a plurality of top pulley wheels disposed around the axis along a first circumference.

4. The pulley assembly as set forth in claim 3, wherein the at least one bottom pulley wheel includes a plurality of bottom pulley wheels disposed around the axis along a second circumference.

5. The pulley assembly as set forth in claim 4, wherein the first circumference and the second circumference are equal in size.

6. The pulley assembly as set forth in claim 5, wherein the plurality of top pulley wheels are circumferentially misaligned with the plurality of bottom pulley wheels such that each of the top pulley wheels are circumferentially aligned with a location centered between circumferentially adjacent bottom pulley wheels.

7. The pulley assembly as set forth in claim 4, wherein a top fin is located between each circumferentially adjacent top pulley wheels and wherein a bottom fin is located between each circumferentially adjacent bottom pulley wheels.

8. The pulley assembly as set forth in claim 4, wherein the plurality of top pulley wheels includes eight top pulley wheels and the plurality of bottom pulley wheels includes eight bottom pulley wheels.

9. The pulley assembly as set forth in claim 1, wherein the at least one top pulley wheel and the at least one bottom pulley wheel each define a groove for seating the cable therein.

10. The pulley assembly as set forth in claim 1, wherein the actuator includes a motor and a spool assembly driven by the motor to reel-in and collect portions of the cable.

11. The pulley assembly as set forth in claim 10, wherein the spool assembly is located under the at least one bottom pulley wheel opposite the at least one top pulley wheel.

12. The pulley assembly as set forth in claim 10, wherein the spool assembly includes a worm wheel and the motor drives a motor shaft that causes rotation of the worm wheel.

13. The pulley assembly as set forth in claim 1, wherein the at least one top pulley wheel is connected to an upper mounting ring and the at least one bottom pulley wheel is connected to a lower mounting ring.

14. The pulley assembly as set forth claim 13, wherein one of the upper mounting ring and the lower mounting ring is slidably connected to the outer sleeve and the other of the upper mounting ring and the lower mounting ring is statically connected to the outer sleeve.

15. A pulley assembly for raising and lowering an associated vehicle body comprising:
    a housing including an outer sleeve extending along an axis;
    a dampening mechanism located within the outer sleeve;
    an upper mounting ring and a lower mounting ring operably connected to the outer sleeve, wherein the upper mounting ring is moveable relative to the lower mounting ring along the axis;
    a plurality of top pulley wheels operably connected to the upper mounting ring;
    a plurality of bottom pulley wheel operably connected to the lower mounting ring;
    a cable weaved between the plurality of top pulley wheels and the plurality of bottom pulley wheels; and
    a spool assembly operably connected to the cable to reel-in the cable and draw the top mounting ring relative to and towards the lower mounting ring along the axis to lower the associated vehicle body and to reel-out the cable to permit the upper mounting ring to move relative to and away from the lower mounting ring to raise the associated vehicle body.

16. The pulley assembly as set forth in claim 15, wherein the lower mounting ring defines a spring seat for locating a first end of a suspension coil spring and biasing the lower mounting ring away from the upper mounting ring.

17. The pulley assembly as set forth in claim 16, wherein a cap is located adjacent to the upper mounting ring for locating a second end of the coil suspension spring.

18. The pulley assembly as set forth in claim 15, wherein the plurality of top pulley wheels are located circumferentially equidistant around the upper mounting ring.

19. The pulley assembly as set forth in claim 18, wherein the plurality of bottom pulley wheels are located circumferentially equidistant around the lower mounting ring.

20. The pulley assembly as set forth in claim 19, wherein the upper mounting ring defines a top fin located between each of the top pulley wheels and the lower mounting ring defines a bottom fin located between each of the bottom pulley wheels, and wherein each of the top fins are circumferentially aligned with one of the bottom pulley wheels and each of the bottom fins are circumferentially aligned with one of the top pulley wheels.

* * * * *